UNITED STATES PATENT OFFICE.

GUNNAR ELIAS CASSEL, OF STOCKHOLM, SWEDEN.

METHOD OF PRODUCING AMMONIA AND CAUSTIC ALKALI.

No. 830,299.  Specification of Letters Patent.  Patented Sept. 4, 1906.

Application filed August 22, 1904. Serial No. 221,749.

*To all whom it may concern:*

Be it known that I, GUNNAR ELIAS CASSEL, civil engineer, a subject of the King of Sweden, residing at 27 Birger-Jarlsgatan, Stockholm, Kingdom of Sweden, have invented new and useful Improvements in Methods of Producing Ammonia and Caustic Alkali, of which the following is a specification.

My invention relates to improvements in the art of producing ammonia and caustic alkali.

It is well known that electrical discharges through air produce a mixture of the chemical combinations of nitrogen and oxygen, such as nitrates and nitrites, and the present invention relates to a method of utilizing this mixture to produce ammonia and, under one modification of my process, caustic alkali also.

In carrying out my invention the gases obtained by electrical discharges through air in a well-known manner are introduced into a solution of caustic alkali, and the solution of nitrate of alkali or nitrite of alkali, or both of these salts, thus obtained is electrolyzed in an electrolytic apparatus with insoluble electrodes which are not separated by any diaphragm. In this electrolysis the salts are reduced to ammonia, which passes off in a gaseous state and is collected in any suitable manner, as will be fully understood by those skilled in the art. The reduction, however, does not yield any appreciable output unless the solution contains a sufficient quantity of nitrites. If, therefore, the solution is deficient in nitrites, the deficiency may be supplied by treating the solution so as to increase the nitrites—as, for example, by adding to the solution a suitable quantity of nitrites or a small quantity of a soluble salt of lead—for example, 0.5 per cent. of nitrate of lead. These additions, however, may be dispensed with if the cathode be made sufficiently large, or, in other words, if the current density at the cathode be small—for example, not more than one ampere per square centimeter.

Another embodiment of my invention consists in carrying out the process in such a way as to produce not only ammonia but also caustic alkali. To do this, I proceed as follows: The gases obtained by electrical discharges through air are absorbed by lime or carbonate of lime, either in a solid state or in solution, whereby nitrate or nitrite of lime is formed. These salts are subsequently treated with an alkaline salt—for example, sulphate or chlorid of an alkali, whereby a corresponding quantity of nitrate or nitrite of alkali is produced, which is subsequently subjected to electrolytic treatment, as hereinbefore described, and thereby the products ammonia and caustic alkali in a pure state are obtained.

Having thus described my invention, what I claim as new, and desire to secure by Letters Patent, is—

1. The process of producing ammonia, which consists in introducing into a solution of hydroxid of a metal capable of absorbing nitrogen-oxygen compounds, a gaseous mixture of the combinations of oxygen with nitrogen obtained by electrical discharges through air, and electrolyzing said solution without a diaphragm.

2. The process of producing ammonia, which consists in introducing into a solution of caustic alkali a gaseous mixture of the combinations of oxygen with nitrogen obtained by electrical discharges through air, and electrolyzing said solution without the use of a diaphragm.

3. The process of producing ammonia, which consists in introducing into a solution of caustic alkali, a gaseous mixture of the combinations of oxygen with nitrogen obtained by electrical discharges through air, then treating the solution to supply any deficiency of nitrites, and electrolyzing the solution without the use of a diaphragm.

4. The process of producing ammonia, which consists in introducing into a solution of caustic alkali, a gaseous mixture of the combinations of oxygen with nitrogen obtained by electrical discharges through air, adding a soluble salt of lead to supply any deficiency of nitrites and electrolyzing the solution without the use of a diaphragm.

5. The process of producing ammonia, which consists in subjecting air to the action of electric discharges, introducing the gaseous product thus obtained into a solution of caustic alkali, adding a soluble salt of lead to supply any deficiency of nitrites and electrolyzing the resultant product.

In testimony whereof I have signed my name to this specification in the presence of two subscribing witnesses.

GUNNAR ELIAS CASSEL.

Witnesses:
 D. DAHLSTRÖM,
 T. RISBERG.